United States Patent [19]

Sekine et al.

[11] 4,312,964

[45] Jan. 26, 1982

[54] POLYOLEFIN RESIN COMPOSITION

[75] Inventors: Noriyuki Sekine; Shigeo Tanaka; Kazuo Tanaka, all of Ichihara, Japan

[73] Assignee: Sumitomo Chemical Company, Limited, Osaka, Japan

[21] Appl. No.: 177,946

[22] Filed: Aug. 14, 1980

Related U.S. Application Data

[63] Continuation-in-part of Ser. No. 85,411, Oct. 16, 1979, abandoned.

[30] Foreign Application Priority Data

Oct. 19, 1978 [JP] Japan ............................. 53-129155
Oct. 18, 1979 [EP] European Pat. Off. .......... 7930226.9

[51] Int. Cl.$^3$ ............................................. C08L 23/08
[52] U.S. Cl. ..................................... 525/88; 525/240
[58] Field of Search .......................... 525/95, 240, 86

[56] References Cited

U.S. PATENT DOCUMENTS

| | | | |
|---|---|---|---|
| 3,906,056 | 9/1975 | Okamoto et al. | 525/95 |
| 3,937,758 | 2/1976 | Castagna | 260/876 B |
| 3,954,704 | 5/1976 | Verne et al. | |
| 4,110,414 | 8/1978 | Lindsay et al. | 260/897 A |
| 4,123,417 | 10/1978 | Finberg | 260/42.46 |

FOREIGN PATENT DOCUMENTS 291556 7/1971 Austria.

*Primary Examiner*—John Kight, III
*Assistant Examiner*—Amelia B. Yarbrough
*Attorney, Agent, or Firm*—Birch, Stewart, Kolasch and Birch

[57] ABSTRACT

Polyolefin resin composition having an excellent resistance to blushing on impact, excellent gloss, high impact resistance and high stiffness, which comprises a specific ethylene/propylene block copolymer (A) consisting essentially of first and second segments of an ethylene/propylene copolymer having each a specific ethylene content and a copolymer of ethylene (B) selected from a specific polyethylene and a specific copolymer of ethylene and an α-olefin having 3 or more carbon atoms. The resin composition is useful for the production of molded products having excellent properties.

5 Claims, No Drawings

POLYOLEFIN RESIN COMPOSITION

This is a Continuation-in-part application of U.S. Ser. No. 085,411 filed on Oct. 16, 1979 and abandoned on Aug. 17, 1980.

The present invention relates to a polyolefin resin composition having an excellent resistance to blushing on impact, excellent gloss, high impact resistance and high stiffness. More particularly, it relates to a polyolefin resin composition comprising a specific ethylene/propylene block copolymer and a specific polyethylene or a specific copolymer of ethylene and an $\alpha$-olefin having 3 or more carbon atoms.

Polypropylene is widely used in various fields because of its excellent mechanical properties. Particularly, a ethylene/propylene block copolymer has both a high impact resistance and a high stiffness and hence is widely used for production of injection molded products. However, the ethylene/propylene block copolymer gives molded products having inferior gloss, and further, when the molded product of ethylene/propylene block copolymer is suffered from impact or bending, the portion suffered from impact or bending whitens, i.e. so-called blusing phenomenon occurs, which impairs significantly the value of the product.

Attempts have been made to improve the properties of an ethylene/propylene block copolymer by blending it with a polyethylene. For example, as is disclosed in U.S. Pat. No. 3,937,758, Eugene G. Castagra had tried to improve impact characteristics at a low temperature of an ethylene/propylene block copolymer by blending it with a polyethylene having a melt flow index of less than 1 g/10 minutes. However, such a composition blended with a polyethylene having a low melt flow index does not show sufficiently improved gloss.

The present inventors have intensively studied the possibilities for improvement of the ethylene/propylene block copolymer in order to eliminate the above-mentioned drawbacks of the copolymer while keeping the excellent properties thereof. As a result, they have found that a composition of a specific ethylene/propylene block copolymer and a specific polymer of ethylene shows the desired excellent properties.

An object of the present invention is to provide an improved polyolefin resin composition. This and other objects of the present invention will be apparent from the following description.

The polyolefin resin composition of the present invention comprises an ethylene/propylene block copolymer (A) consisting essentially of at least one first segment of an ethylene/propylene copolymer having an ethylene content of 0.5 to 2.5% by weight, preferably 1.0 to 2.0% by weight, and at least one second segment of an ethylene/propylene copolymer having an ethylene content of 15 to 35% by weight, said second segment being contained in a proportion of 10 to 30% by weight, preferably 10 to 25% by weight, based on the weight of the block copolymer (A), and a polymer of ethylene (B) selected from the group consisting of polyethylene and a copolymer of ethylene and an $\alpha$-olefin having 3 or more carbon atoms, which has a density of 0.93 to 0.97 g/cm$^3$ and a melt flow index of 2.0 to 50 g/10 minutes at 190° C., said composition having a ratio (R) of the weight of the polymer of ethylene (B)/the weight of the second segment of the block copolymer (A) satisfying the following formula: $0.70 \leq R \leq 2.2$.

The ethylene/propylene block copolymer (A) may consist essentially of a single first segment and a single second segment or repeat of the coupled segments, e.g. two or more times repeat of a couple of the first segment and the second segment. The first segment may consist of a portion of a polymer of propylene having an ethylene content of substantially zero and a portion of a copolymer of ethylene and propylene, subject to satisfy the ethylene content of 0.5 to 2.5% by weight, preferably 1.0 to 2.0% by weight. The ethylene/propylene block copolymer can be produced by conventional processes, for instance by a process as described in Japanese Patent Publication No. 25585/1978.

The polymer of ethylene (B) is a polyethylene or a copolymer of ethylene and an $\alpha$-olefin having 3 or more carbon atoms, preferably 3 to 5 carbon atoms, such as propylene, 1-butene, and 1-pentene. The polymer of ethylene has a density of 0.93 to 0.97 g/cm$^3$, preferably 0.94 to 0.97 g/cm$^3$, at 23° C. and a melt flow index of 2.0 to 50 g/10 minutes at 190° C., preferably 4.0-50 g/10 minutes at 190° C. The polymer of ethylene can be produced by conventional processes, for instance, a process as described in High Polymers, Vol. XX (Interscience).

The polyolefin resin composition of the present invention should comprise the specified ethylene/propylene block copolymer (A) having the specified ethylene content in each segment and the specified polymer of ethylene (B) having the specified density and melt flow index and further should have the specified ratio (R) of the weight of the polymer of ethylene (B)/the weight of the second segment of the block copolymer (A) in order to give the desired properties thereto.

When the ethylene content of the first segment of the ethylene/propylene block copolymer is smaller than 0.5% by weight, the blushing on impact and the gloss of the product are insufficiently improved, and on the other hand, when the ethylene content of the first segment is larger than 2.5% by weight, the stiffness of the product is significantly decreased, and the excellent properties of the ethylene/propylene block copolymer are impaired. When the ethylene content of the second segment of the ethylene/propylene block copolymer is smaller than 15% by weight, the impact resistance of the product is significantly decreased, and when the ethylene content of the second segment is larger than 35% by weight, the blushing on impact and gloss of the product is insufficiently improved. Further, when the second segment is contained in a proportion of smaller than 10% by weight based on the weight of the ethylene/propylene block copolymer (A), the product shows inferior impact resistance, and on the other hand, when the second segment is contained in a proportion of larger than 30% by weight based on the weight of the block copolymer (A), the product shows a significantly low stiffness.

Furthermore, when the polymer of ethylene (B) has a density of smaller than 0.93 g/cm$^3$, the product shows a significantly low stiffness, and when the polymer of ethylene (B) has a melt flow index of smaller than 2.0 g/10 minutes, the product shows a significantly inferior gloss. Moreover, when the ratio (R) of the weight of the polymer of ethylene (B)/the weight of the second segment of the block copolymer (A) is smaller than 0.70, the blushing on impact of the product is insufficiently improved and the gloss of the product is rather deteriorated. On the other hand, when the ratio (R) is larger than 2.2, the blushing on impact and gloss of the product are almost not improved, and undesirable an effects appears in the formation of molded products from the composition, for instance, peeling in injection molding.

The mixing of the ethylene/propylene block copolymer (A) and the polymer of ethylene (B) can be carried out by using a conventional apparatus used in a melt mixing method, such as a screw extruder, a heat rool, a Bambury mixer, or the like.

The composition of the present invention may also be incorporated with other additives, such as a deterioration preventing agent, a weathering agent, a nucleating agent, an antistatic agent, a colorant, a filler, or the like, in accordance with the utilities of the product.

In the present invention, the various physical and chemical properties of the composition are measured by the following methods.

(1) Ethylene content of the ethylene/propylene block copolymer:

A sheet is formed from the copolymer by heat press, and the infrared spectrum of the sheet is measured at an optical density of 736 cm$^{-1}$ and 722 cm$^{-1}$.

(2) Proportion of each segment in the ethylene/propylene block copolymer:

The melting calorie of the first segment alone and the melting calorie of the first segment in the ethylene/propylene block copolymer are measured by using a differential scanning calorimeter (made by Parkin Elmer Co.), and the proportion is calculated from the difference of both data thus obtained.

(3) Melt flow index:

It is measured in accordance with the method as described in ASTM D 1238-62T by using a melt indexer (made by Takara Kogyo K.K.).

(4) Density:

A sheet having a thickness of 0.5 mm is formed by heat press of the polymer, and the density of the sheet is measured in accordance with the method as described in JIS K 6758-1968 by using a direct-reading density meter (made by Shibayama Kagaku Kiki).

(5) Gloss:

A sheet having a thickness of 1 mm is formed from the composition by using a screw in-line type injection molding machine (IS 80A, made by Toshiba Kikai K.K.), and the gloss of the sheet is measured at a reflectance of 45° by using a gloss meter (made by Murakami Shikisai Kenkyusho).

(6) Drop-weight impact test:

The same sheet as used in the above item (5) is subjected to the test by using a DuPont impact tester (made by Toyo Seiki K.K.). It is measured at −20° C. using a missile having a tip curvature radius of ¼ inch and a weight, and the breakage per falling energy level is calculated. The data are shown by the energy at a breakage of zero.

(7) Area of blushing on impact:

In the same manner as in the above drop-weight impact test, a weight of 1 kg is fallen from the height of 10 cm, and after 5 days, area of whitened portion is measured.

(8) Stiffness modulus:

A sheet having a thickness of 1 mm formed by heat press is subjected to the test in accorgance with the method as described in ASTM D 747-58T by using an Olsen type stiffness tester (made by Toyo Seiki K.K.)

The present invention is illustrated by the following Examples but is not limited thereto. In the Examples, part is shown by weight, unless specified otherwise.

EXAMPLES 1 TO 3 AND REFERENCE EXAMPLES 1 TO 4

In the first stage, a mixture of ethylene and propylene which contained a small amount of hydrogen was polymerized in a fixed amount of n-heptane in the presence of a catalyst consisting of titanium trichloride and diethylaluminum chloride, and thereafter, hydrogen, ethylene and propylene were removed under reduced pressure. In the second stage, a mixture of ethylene and propylene which contained a small amount of hydrogen and a larger amount of ethylene than that in the first stage was polymerized in a fixed amount. After the polymerization, n-butanol was added to the polymerization mixture to deactivate the catalyst, and then, the mixture was centrifuged to remove n-heptane and polymer soluble therein and dried to give a powdery ethylene/propylene block copolymer. The ethylene/propylene block copolymer thus obtained had an intrinsic viscosity $[\eta]_{tetralin}^{135°\ C.}$ of 2.5 dl/g, an ethylene content in the first segment of 1.0% by weight, an ethylene content in the second segment of 30% by weight, and a proportion of the second segment to whole polymer of 18% by weight.

The ethylene/propylene block copolymer obtained above was mixed with polyethylene having a density of 0.965 g/cm$^3$ at 23° C. and a melt flow index of 6 g/10 minutes at 190° C. in mixing ratio as shown in Tabel 1 with a Henschel mixer. To the mixture were also added Sumilizer BHT ® and calcium stearate as a stabilizer and aluminum p-tert-butylbenzoate as a nucleating agent in an amount of 0.2 part, 0.2 part and 0.3 part respectively per 100 parts of the whole resin.

The above mixture was melt-kneaded with a screw type extruder and formed into pellets, on which various properties were measured. The results are shown in Table 1.

TABLE 1

| Example No. | Mixing ratio (part) Ethylene/propylene block copolymer | Polyethylene | R | Gloss (%) | Area of blusing on impact (mm$^2$) | Drop-weight impact strength (kg · cm) | Stiffness modulus (kg/cm$^2$) |
|---|---|---|---|---|---|---|---|
| Example 1 | 85 | 15 | 0.98 | 90 | 87 | 97 | 8400 |
| Example 2 | 80 | 20 | 1.39 | 96 | 72 | 98 | 8200 |
| Example 3 | 75 | 25 | 1.85 | 97 | 56 | 95 | 8400 |
| Reference Example 1 | 100 | 0 | 0 | 85 | 180 | 68 | 8800 |
| Example 2 | 95 | 5 | 0.29 | 80 | 170 | 87 | 8800 |
| Example 3 | 90 | 10 | 0.62 | 83 | 140 | 95 | 8600 |

TABLE 1-continued

| Example No. | Mixing ratio (part) Ethylene/ propylene block copolymer | Poly- ethylene | R | Gloss (%) | Area of blusing on impact (mm²) | Drop- weight impact strength (kg . cm) | Stiffness modulus (kg/cm²) |
|---|---|---|---|---|---|---|---|
| Example 4 | 65 | 35 | 2.99 | 96 | 50 | 90 | 8100 |

[Remark]: In the product of Reference Example 4, peeling was observed on the surface of the injected molded product.

EXAMPLES 4 AND 5 AND REFERENCE EXAMPLES 5 AND 6

In the same manner as described in Example 1 to 3, there were obtained ethylene/propylene block copolymers having an intrinsic viscosity $[\eta]_{tetralin}^{135° C.}$ of 2.5 dl/g, various ethylene contents in the first segment, an ethylene content in the second segment of 23% by weight, and a proportion of the second segment to whole polymer of 18% by weight.

In the same manner as described in Examples 1 to 3, the ethylene/propylene block copolymers obtained above (each 80 parts) were mixed with the polyethylene as used in Examples 1 to 3 (20 parts) and formed into pellets, on which various properties were measured. The results are shown in Table 2.

TABLE 2

| Example No. | Ethylene content in the first segment (% by weight) | Gloss (%) | Area of blusing on impact (mm²) | Drop- weight impact strength (kg . cm) | Stiffness modulus (kg/cm²) |
|---|---|---|---|---|---|
| Example 4 | 0.7 | 97 | 68 | 80 | 8600 |
| Example 5 | 2.0 | 98 | 47 | 86 | 7600 |
| Reference Example 5 | 0 | 91 | 136 | 72 | 9200 |
| Reference Example 6 | 4 | 99 | 31 | 90 | 5600 |

EXAMPLES 6 AND 7 AND REFERENCE EXAMPLES 7 TO 9

In the same manner as described in Example 1 to 3, there were obtained ethylene/propylene block copolymers having an intrinsic viscosity $[\eta]_{tetralin}^{135° C.}$ of 2.5 dl/g, an ethylene content in the first segment of 1% by weight, various ethylene contents in the second segment, and a proportion of the second segment to whole polymer of 18% by weight.

In the same manner as described in Examples 1 to 3, the ethylene/propylene block copolymers (each 80 parts) were mixed with the polyethylene as used in Examples 1 to 3 (20 parts) and formed into pellets, on which various properties were measured. The results are shown in Table 3.

TABLE 3

| Example No. | Ethylene content in the second segment (% by weight) | Gloss (%) | Area of blusing on impact (mm²) | Drop- weight impact strength (kg . cm) | Stiffness modulus (kg/cm²) |
|---|---|---|---|---|---|
| Example 6 | 18 | 97 | 45 | 62 | 8900 |
| Example 7 | 35 | 95 | 80 | 106 | 8200 |
| Reference Example 7 | 8 | 99 | 18 | 4 | 10100 |
| Example 8 | 50 | 87 | 172 | 110 | 8000 |
| Example 9 | 95 | 90 | 21 | 20 | 9900 |

EXAMPLES 8 TO 10 AND REFERENCE EXAMPLES 10 AND 11

In the same manner as described in Examples 1 to 3, there were obtained ethylene/propylene block copolymers having an intrinsic viscosity $[\eta]_{tetralin}^{135° C.}$ of 2.5 dl/g, an ethylene content in the first segment of 1% by weight, an ethylene content in the second segment of 30% by weight, and various proportions of the second segment to whole of the polymer.

In the same manner as described in Examples 1 to 3, the ethylene/propylene block copolymers obtained above were mixed with the polyethylene as used in Examples 1 to 3 in a mixing ratio that the ratio (R) became 1.5, and formed into pellets, on which various properties were measured. The results are shown in Table 4.

TABLE 4

| Example No. | Ratio of the first segment (% by weight) | Gloss (%) | Area of blusing on impact (mm²) | Drop- weight impact strength (kg . cm) | Stiffness modulus (kg/cm²) |
|---|---|---|---|---|---|
| Example 8 | 12 | 98 | 76 | 68 | 9000 |
| Example 9 | 18 | 97 | 72 | 101 | 8200 |
| Example 10 | 25 | 96 | 66 | 108 | 7700 |
| Reference Example 10 | 7 | 99 | 73 | 17 | 9800 |
| Example 11 | 35 | 92 | 68 | 112 | 5900 |

EXAMPLES 11 TO 14 AND REFERENCE EXAMPLES 12 AND 13

The ethylene/propylene block copolymer as obtained in Examples 1 to 3 (80 parts) was mixed with the polyethylene as shown in Table 5 (20 parts) and formed into pellets, on which various properties were measured. The results are shown in Table 5.

TABLE 5

| Example No. | Den- sity of poly- ethyl- ene (g/cm²) | Melt flow ratio of poly- ethylene (g/10 minutes) | Gloss (%) | Area of blusing on impact (mm²) | Drop- weight impact strength (kg . cm) | Stiff- ness modu- lus (kg/cm²) |
|---|---|---|---|---|---|---|
| Ex. 11 | 0.965 | 6 | 97 | 72 | 98 | 8200 |
| Ex. 12 | 0.965 | 20 | 96 | 71 | 86 | 8200 |

TABLE 5-continued

| Example No. | Density of polyethylene (g/cm²) | Melt flow ratio of polyethylene (g/10 minutes) | Gloss (%) | Area of blusing on impact (mm²) | Drop-weight impact strength (kg · cm) | Stiffness modulus (kg/cm²) |
| --- | --- | --- | --- | --- | --- | --- |
| Ex. 13 | 0.950 | 7 | 97 | 75 | 97 | 7900 |
| Ex. 14 | 0.934 | 8 | 96 | 73 | 103 | 7700 |
| Reference |  |  |  |  |  |  |
| Ex. 12 | 0.950 | 0.3 | 65 | 85 | 89 | 8000 |
| Ex. 13 | 0.919 | 7 | 94 | 82 | 108 | 6600 |

What is claimed is:

1. A polyolefin resin composition which comprises an ethylene/propylene block copolymer (A) consisting essentially of at least one first segment of an ethylene/propylene copolymer having an ethylene content of 0.5 to 2.5% by weight, and at least one second segment of an ethylene/propylene copolymer having an ethylene content of 15 to 35% by weight, said second segment being contained in a proportion of 10 to 30% by weight based on the weight of the block copolymer (A), and a polymer of ethylene (B) selected from the group consisting of polyethylene and a copolymer of ethylene and an α-olefin having 3 or more carbon atoms, which has a density of 0.93 to 0.97 g/cm³ and a melt flow index of 2.0 to 50 g/10 minutes at 190° C., said composition having a ratio (R) of the weight of the polymer of ethylene (B)/the weight of the second segment of the block copolymer (A) satisfying the following formula: $0.70 \leq R \leq 2.2$ 2. A polyolefin resin composition according to claim 1, wherein the ethylene content in the first segment of ethylene/propylene copolymer is in the range of 1.0 to 2.0% by weight.

3. A polyolefin resin composition according to claim 1, wherein the second segment is contained in a proportion of 10 to 25% by weight based on the weight of the block copolymer (A).

4. A polyolefin resin composition according to claim 1, wherein the polymer of ethylene (B) is a polyethylene having a density of 0.94 to 0.97 g/cm³ at 23° C. and a melt flow index of 4.0 to 50 g/10 minutes at 190° C.

5. A polyolefin resin composition according to claim 1, wherein the polymer of ethylene (B) is a copolymer of ethylene and an α-olefin selected from the group consisting of propylene, 1-butene, and 1-pentene.

* * * * *